UNITED STATES PATENT OFFICE.

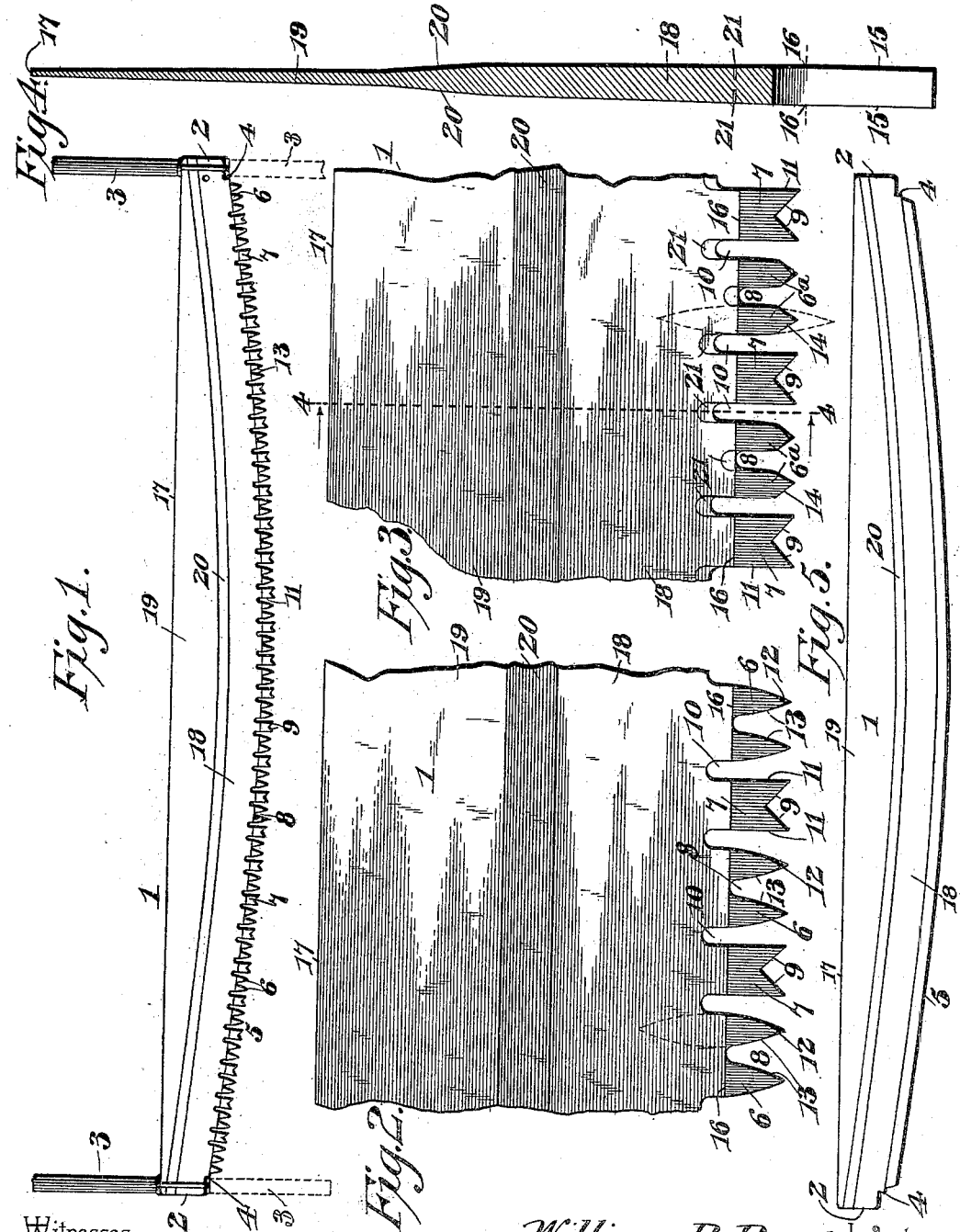

WILLIAM B. PROUTY, OF RIDGWAY, PENNSYLVANIA.

SAW.

SPECIFICATION forming part of Letters Patent No. 622,536, dated April 4, 1899.

Application filed October 26, 1898. Serial No. 694,610. (No model.)

*To all whom it may concern:*

Be it known that I, WILLIAM B. PROUTY, a citizen of the United States, residing at Ridgway, in the county of Elk and State of Pennsylvania, have invented a new and useful Saw, of which the following is a specification.

This invention relates to saws, and more particularly to improvements in the type of saws known as "crosscut-saws," with a view of producing a saw that will cut rapidly and will not become "shoulder-bound" or wedged in the kerf.

To this end the invention primarily contemplates an improved construction of saw-blade having the teeth thereof ground in such a manner as to insure a complete clearance for the dust and chips, so as to avoid the saw becoming what is known in the art as "shoulder-bound," while at the same time preventing the teeth from wearing out of gage at the center of the saw, as it is understood that the greatest wear in a crosscut-saw occurs at a central or intermediate point between the ends thereof.

A further object of the invention is to form the saw-blade of a shape that will insure the stiffening or trussing thereof in the direction of its length, while at the same time entirely obviating a binding or wedging in the kerf; and in addition to these features the invention also contemplates an improvement which will enable the gumming of the saw without resorting to the gumming devices which are commonly employed for this purpose.

With these and other objects in view, which will readily appear as the nature of the invention is better understood, the same consists in the novel construction, combination, and arrangement of parts hereinafter more fully described, illustrated, and claimed.

While the essential and characteristic features of the invention are necessarily susceptible of modification, still the preferred embodiment of the invention is illustrated in the accompanying drawings, in which—

Figure 1 is a side view of a crosscut-saw constructed in accordance with the present invention. Fig. 2 is an enlarged elevation of a section of the saw-blade. Fig. 3 is a view similar to Fig. 2, showing a modified form of the cutting-teeth. Fig. 4 is an enlarged cross-sectional view on the line 4 4 of Fig. 3. Fig. 5 is an elevation of the saw-blade blank prior to the cutting of the teeth therein.

Referring to the accompanying drawings, the numeral 1 designates the saw-blade, having the usual conformation of outline of the blade of an ordinary crosscut-saw and is provided with the squared reduced extremities 2, adapted to have attached thereto the usual handles 3, which are grasped to provide for the reciprocation of the saw in the timber being cut. At one edge of its reduced extremities 2 the saw-blade is formed with the squared shoulders 4, with which the handle connection abuts to insure a proper positioning and reversal, if necessary, of the handles on the ends of the blade, and in order to utilize all of the metal in the blade the arched or convexed longitudinal edge 5 thereof is formed with teeth its entire length between the said shoulders 4.

In the present invention any design of teeth may be used in connection with the ground surfaces or faces, which will be hereinafter referred to; but I preferably employ the form and arrangement of teeth shown in Figs. 2 and 3 of the drawings. Referring particularly to Figs. 1 and 2 of the drawings, it will be seen that the working edge of the saw-blade has formed therein a continuous series of alternately-arranged cutting and raking teeth 6 and 7, respectively. The cutting-teeth 6 are arranged in pairs, with a reëntrant chip-gullet 8 spacing the same apart, while the raking-teeth 7, which alternate with the pairs of cutting-teeth 6, are of the usual double or bifurcated form and are provided with the oppositely-extending V-shaped chisels 9, and the intervening spaces or notches between the raking-teeth 7 and the adjacent cutting-teeth 6 form clearance-pockets 10, which are cut a material distance into the working edge of the blade and are of a greater depth than the chip-gullets 8 between each two cutting-teeth 6.

The side edges of the raking-teeth (designated by 11 and forming one wall of the clearance-pockets 10) are perfectly straight and are at right angles to the length of the saw-blade to prevent a clogging up of the pockets 10 and insure a ready clearance therefrom.

The cutting-teeth of each pair are provided at their points with the usual cutting-bevels 12, formed, respectively, upon opposite faces of the teeth, and it will also be understood that in the practical use of the saw the cutting-teeth are designed to be given the proper "set," respectively, in opposite directions, and for this reason the set of the saw-teeth is not emphasized in the drawings.

For certain kinds of wood the saw-teeth 6 are preferably of the configuration shown in Figs. 1 and 2 of the drawings and are provided with opposite curved side edges 13, struck on the arcs of similar circles and converging to the beveled points of the teeth; but in other classes of work the saw-teeth are preferably of the form shown in Fig. 3 of the drawings. In this form of the teeth, which are designated by $6^a$, the opposite side edges thereof are also struck on the arcs of similar circles, but are provided with angular or V-shaped cutting-points 14, which insure the proper passage of the saw through the wood. In all forms, however, of the cutting-teeth of the saw said teeth, as well as the raking-teeth 7, are provided upon their opposite flat surfaces with the straight ground faces 15. The straight ground faces 15 of the cutting and raking teeth are uniform from the line of grind (designated by the number 16) to the extreme points of the teeth, and the extent of said ground faces between the points of the teeth and the line of grind 16 is less than the depth of the clearance-pockets 10, which extend into the saw blade or body a material distance beyond the line of grind. By reason of this specific relation between the extent of the ground faces 15 and the depth of the pockets 10 it is impossible for the saw to become bound within the shoulders at the base of the pockets 10, or, in other words, to become shoulder-bound, and said construction also insures a uniform wear of the saw and prevents the same from wearing out of gage at its central portion.

From the line of grind 16 for the cutting and raking teeth the body of the saw-blade is tapered in thickness to the back edge 17 thereof. While the blade tapers in thickness nearly its entire width, as indicated, the same is provided with a stout portion 18, which extends from the line of grind 16 for the teeth to an intermediate point between the edges of the blade and from this point to the back edge 17 of the blade is made materially thinner than the portion 18 to form a thin guiding-web 19. Upon opposite sides of the blade, at the point where the stout and thin portions merge together, there are produced the longitudinal stiffening-shoulders 20, extending longitudinally from end to end of the blade and acting in the capacity of a truss therefor.

From the foregoing it will be seen that the shoulder or base portions of the clearance-pockets 10 lie within the tapered portion of the blade, so that a clearance of the dust and chips is absolutely insured, while the stout portion 18 gives sufficient strength or body to the blade, and the web 19 serves as a guiding-plate which travels within the kerf and by reason of its taper cannot become bound within the kerf.

The present invention also contemplates means to gum the saw-blade without the use of a separate gumming device, and to secure this result the saw-blade is formed in opposite faces thereof, directly adjacent to the bases of the gullets and pockets 8 and 10, with circular nicks or grooves 21, the extremities of which lead to the edges of the gullets and pockets 8 and 10, so that when it is desired to gum the saw it is simply necessary to break out by a sharp blow of a suitable tool or instrument the portions of metal within the circle of the nicks or grooves 21.

From the foregoing it is thought that the construction, operation, and many advantages of the herein-described saw will be readily apparent to those skilled in the art; but at this point it may be explained that while the straight faces 15 of the teeth may be ground after the same are cut into the blade, still the entire blank may be ground, including the faces at the working edge of the blade, prior to the cutting of the teeth, as plainly shown in Fig. 5 of the drawings.

Changes in the form, proportion, and the minor details of construction may be resorted to without departing from the principle or sacrificing any of the advantages of this invention.

Having thus described the invention, what is claimed, and desired to be secured by Letters Patent, is—

1. In a saw, the saw-blade provided with reëntrant clearance-pockets between the teeth, and having upon opposite sides of the teeth straight ground faces the zone of grinding being of less width than the depth of said pockets, said blade being tapered in thickness from the line of grind for said faces in a direction toward its back edge, substantially as set forth.

2. In a saw, the saw-blade provided at its working edge with alternating cutting and raking teeth, and reëntrant clearance-pockets at each side of the raking-teeth, both the cutting and the raking teeth being provided on their opposite flat surfaces with straight ground faces the zone of grinding being of less width than the depth of said pockets, said saw-blade being tapered in thickness from the line of grind for said faces to its back edge, substantially as set forth.

3. In a saw, the saw-blade provided with reëntrant clearance-pockets between the teeth and having upon opposite sides of the teeth straight ground faces the zone of grinding being of less extent in width than the depth of said pockets, said blade being tapered in thickness from the line of grind for said faces to its back edge and having within the plane of its taper relatively stout and thin portions producing at their point of juncture stiffening-shoulders running from end to end of the blade, substantially as set forth.

4. In a saw, the saw-blade provided with reëntrant spaces between its teeth and having formed in opposite faces thereof directly adjacent to the bases of said spaces circular nicks or grooves to facilitate gumming of the blade, substantially as set forth.

In testimony that I claim the foregoing as my own I have hereto affixed my signature in the presence of two witnesses.

WILLIAM B. PROUTY.

Witnesses:
JOHN H. SIGGERS,
ROBT. E. CRUMP.